(12) United States Patent
Muscariello et al.

(10) Patent No.: US 11,025,589 B1
(45) Date of Patent: Jun. 1, 2021

(54) LOCATION-INDEPENDENT DATA-OBJECT NAME MAPPING

(71) Applicant: Cisco Technology, Inc., San Jose, CA (US)

(72) Inventors: Luca Muscariello, Paris (FR); Warren Scott Wainner, Sterling, VA (US); Giovanna Carofiglio, Paris (FR); Jordan Augé, Saint-Cyr-l'Ecole (FR)

(73) Assignee: CISCO TECHNOLOGY, INC, San Jose, CA (US)

( * ) Notice: Subject to any disclaimer, the term of this patent is extended or adjusted under 35 U.S.C. 154(b) by 4 days.

(21) Appl. No.: 16/118,738

(22) Filed: Aug. 31, 2018

(51) Int. Cl.
| | | |
|---|---|---|
| H04L 29/12 | (2006.01) | |
| H04L 12/747 | (2013.01) | |
| H04L 12/741 | (2013.01) | |
| H04L 12/733 | (2013.01) | |

(52) U.S. Cl.
CPC ........... *H04L 61/609* (2013.01); *H04L 45/20* (2013.01); *H04L 45/742* (2013.01); *H04L 45/745* (2013.01); *H04L 61/1511* (2013.01)

(58) Field of Classification Search
CPC ..... H04L 61/609; H04L 45/20; H04L 45/742; H04L 45/745; H04L 61/1511
See application file for complete search history.

(56) References Cited

U.S. PATENT DOCUMENTS

| | | | | |
|---|---|---|---|---|
| 6,963,914 B1* | 11/2005 | Breitbart | ............ | H04L 67/1095 709/225 |
| 7,343,422 B2 | 3/2008 | Garcia-Luna-Aceves et al. | | |
| 7,984,149 B1* | 7/2011 | Grayson | ................. | H04L 65/80 709/226 |
| 8,819,227 B1* | 8/2014 | Keralapura | ............. | H04L 45/38 709/224 |
| 9,185,186 B2* | 11/2015 | Hong | ..................... | H04L 67/327 |
| 9,363,665 B1* | 6/2016 | Burcham | ................ | H04W 8/18 |
| 9,374,244 B1* | 6/2016 | Brandwine | ............. | H04L 21/00 |
| 9,491,135 B1* | 11/2016 | Earl | ..................... | H04L 61/1511 |
| 9,565,157 B2* | 2/2017 | Chhabra | ............. | H04L 61/1552 |
| 9,678,998 B2* | 6/2017 | Sevilla | ..................... | G06F 16/22 |
| 9,762,618 B2* | 9/2017 | Goldstein | ........... | G06F 21/6218 |
| 9,882,957 B1* | 1/2018 | Mostert | .................. | H04L 67/02 |
| 9,894,033 B2* | 2/2018 | Kish | ................... | H04L 61/1511 |
| 10,440,059 B1* | 10/2019 | McCarty | ............. | H04L 63/1433 |
| 2006/0080546 A1* | 4/2006 | Brannon | ............... | H04L 9/3239 713/185 |
| 2008/0320111 A1* | 12/2008 | Yan | ..................... | H04L 12/2898 709/220 |

(Continued)

FOREIGN PATENT DOCUMENTS

KR    101371223 B1    3/2014

*Primary Examiner* — William G Trost, IV
*Assistant Examiner* — Monishwar Mohan
(74) *Attorney, Agent, or Firm* — Merchant & Gould P.C.

(57) ABSTRACT

A networked electronic device produces a data object comprising content and assigns a location-independent application-level name to the data object. The location-independent application-level name is independent of any network location at which the content is available. The networked electronic device maps the location-independent application-level name to an IP address, generates a DNS resource record specifying the mapping of the location-independent application-level name to the IP address, and provides the DNS resource record to a DNS network node.

20 Claims, 8 Drawing Sheets

(56) References Cited

U.S. PATENT DOCUMENTS

| | | | |
|---|---|---|---|
| 2010/0174829 A1* | 7/2010 | Drako | H04L 51/28 709/245 |
| 2013/0104114 A1* | 4/2013 | Reiss | G06F 8/65 717/170 |
| 2013/0212300 A1* | 8/2013 | Eggleston | H04L 61/2007 709/245 |
| 2014/0004830 A1* | 1/2014 | McCann | H04W 12/06 455/411 |
| 2014/0280963 A1* | 9/2014 | Burbridge | H04L 47/70 709/226 |
| 2014/0281715 A1* | 9/2014 | Khan | G06F 11/263 714/28 |
| 2014/0298415 A1* | 10/2014 | Xie | H04L 61/2589 726/3 |
| 2014/0304325 A1* | 10/2014 | Khanal | H04L 63/0428 709/203 |
| 2015/0006615 A1* | 1/2015 | Wainner | H04L 29/06047 709/203 |
| 2015/0032869 A1* | 1/2015 | Chan | H04L 61/2076 709/221 |
| 2015/0081767 A1* | 3/2015 | Evens | H04L 67/30 709/203 |
| 2015/0146722 A1* | 5/2015 | Wainner | H04L 45/742 370/392 |
| 2015/0146737 A1* | 5/2015 | Muscariello | H04L 47/19 370/400 |
| 2015/0244670 A1* | 8/2015 | Dong | H04L 61/1511 709/245 |
| 2015/0350044 A1* | 12/2015 | Thomassian | H04L 61/1511 370/252 |
| 2016/0028607 A1* | 1/2016 | Weill | H04L 67/2842 709/224 |
| 2017/0012780 A1* | 1/2017 | Kaliski, Jr. | H04L 61/305 |
| 2017/0111322 A1* | 4/2017 | Patidar | H04L 63/0823 |
| 2017/0195375 A1* | 7/2017 | Thubert | H04L 65/1069 |
| 2017/0302576 A1 | 10/2017 | Townsley et al. | |
| 2018/0048785 A1* | 2/2018 | Shibata | H04N 1/00204 |
| 2018/0146071 A1* | 5/2018 | Himayat | H04L 43/16 |
| 2019/0141015 A1* | 5/2019 | Nellen | H04L 61/1511 |

* cited by examiner

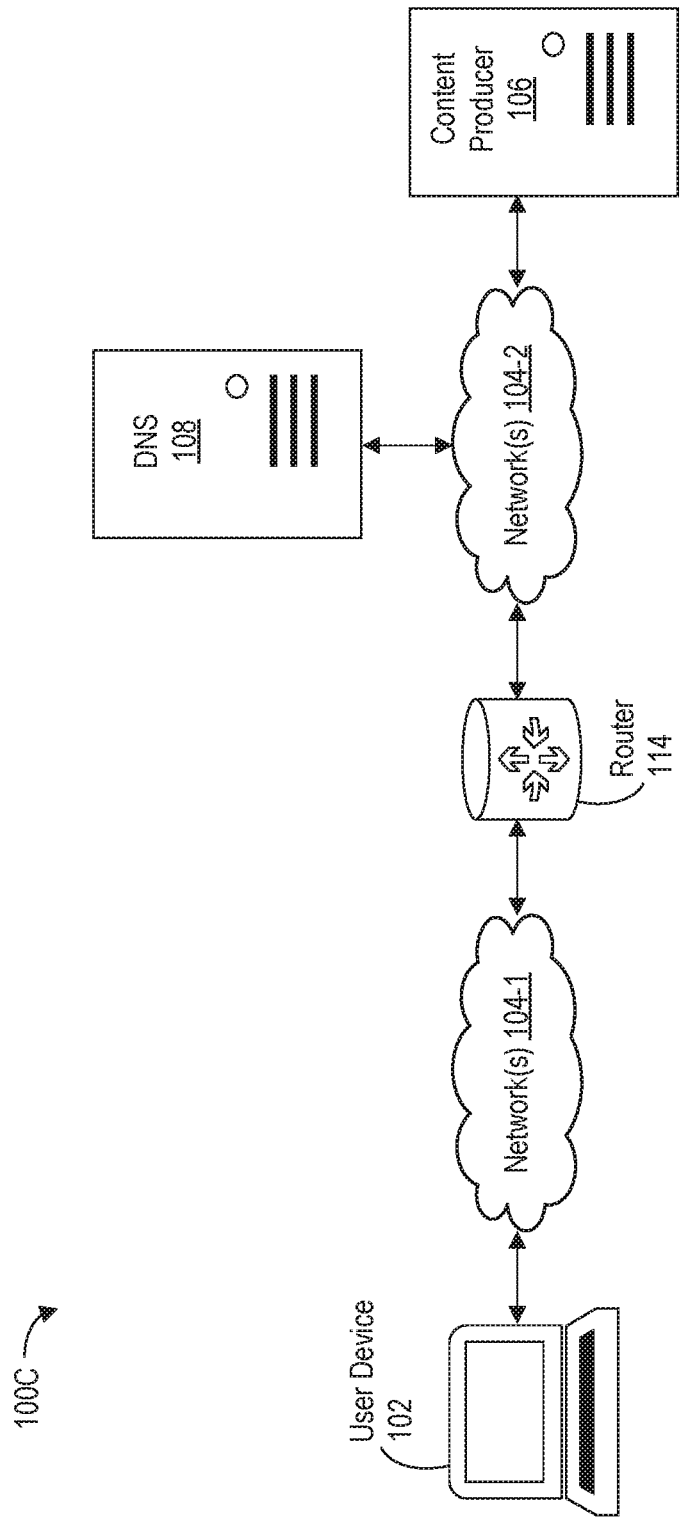

Application-Name
Resource Record 300

| | |
|---|---|
| URI | 302 |
| Type | 304 |
| Class | 306 |
| TTL | 308 |
| RDLength | 310 |
| IPv6 Address | 312 |

Figure 3A

Network-Name
Resource Record 320

| | |
|---|---|
| IPv6 Address | 322 |
| Type | 324 |
| Class | 326 |
| TTL | 328 |
| RDLength | 330 |
| URI | 332 |

Figure 3B

LOCATION-INDEPENDENT DATA-OBJECT NAME MAPPING

TECHNICAL FIELD

The present disclosure generally relates to instantiating name spaces for data objects, and in particular, to using the Domain-Name System (DNS) to map location-independent application-level names for data objects to respective Internet Protocol (IP) addresses.

BACKGROUND

A variety of applications, referred to as content packagers or content producers, dynamically produce data objects that comprise content in real-time. For example, a just-in-time-packaging (JITP) system receives content requests, retrieves the requested content, and produces corresponding data objects by packaging the content using formats corresponding to respective requests. The data objects are transmitted to the requestors. Content producers may operate in accordance with Information-Centric Networking (ICN) or hybrid ICN (hICN), but doing so presents significant challenges. For example, there is a need for methods of performing real-time binding of a name-space to data objects as the data objects are created.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1C are block diagrams illustrating network architectures in accordance with some implementations.

FIGS. 3A-3B show data structures for DNS resource records in accordance with some implementations.

Figure 1A:
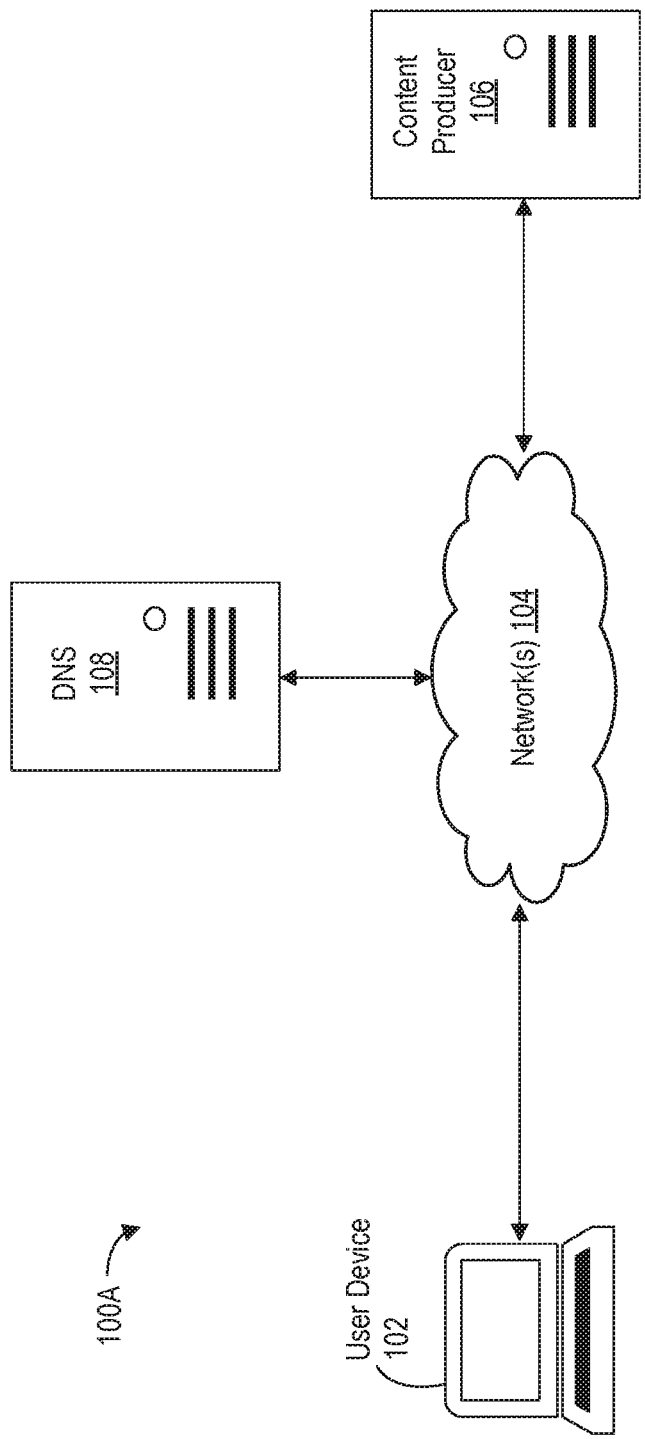

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable real-time binding of a name-space to data objects as the data objects are produced and/or allows a name-space to be used for distributed caching before the cache entities even receive respective requests (e.g., ICN or hICN interests). For example, a networking method is performed by a networked electronic device that includes one or more processors and memory (e.g., non-transitory memory) storing instructions for execution by the one or more processors. In the method, a data object that comprises content is produced and assigned a location-independent application-level name. The location-independent application-level name is independent of any network location at which the content is available. The location-independent application-level name is mapped to an IP address. A DNS resource record is generated that specifies the mapping of the location-independent application-level name to the IP address. The DNS resource record is provided to a DNS network node.

FIG. 1A is a block diagram illustrating a network architecture 100A in accordance with some implementations. In the network architecture 100A, one or more user devices 102 (a single user device 102 is shown for simplicity), a content producer 106 (e.g., a server system running a content-production application), and a DNS network node 108 (e.g., a server system that performs DNS name resolution) are communicatively coupled to each other through one or more networks 104. In some implementations, the one or more networks 104 include public communication networks, private communication networks, or a combination of both public and private communication networks. For example, the one or more networks 104 can include any network (or combination of networks) such as the Internet, other wide area networks (WAN), local area networks (LAN), metropolitan area networks (MAN), peer-to-peer networks, and/or ad-hoc connections. Examples of the user device 102 include, without limitation, a mobile electronic device (e.g., mobile phone), wearable computing device, laptop computer, tablet computer, desktop computer, or another electronic device. Server systems for the content producer 106 and/or DNS network node 108 may each be a single server computer or multiple server computers (e.g., multiple computing devices working together to perform the actions of a server system, such as for cloud computing).

Application-level names (i.e., names used by an application running on the content producer 106) of data objects produced by the content producer 106 map to IP addresses. Records of these mappings are stored in a DNS network node 108. The DNS network node 108 may correspond to a particular level (e.g., a leaf node) in the hierarchical DNS system. In some implementations, requests from the user device 102 are initially directed to a name corresponding to a data object. The DNS network node 108 is queried to determine the corresponding IP address and the request is updated accordingly, so that the request becomes directed to the IP address.

Figure 1B:
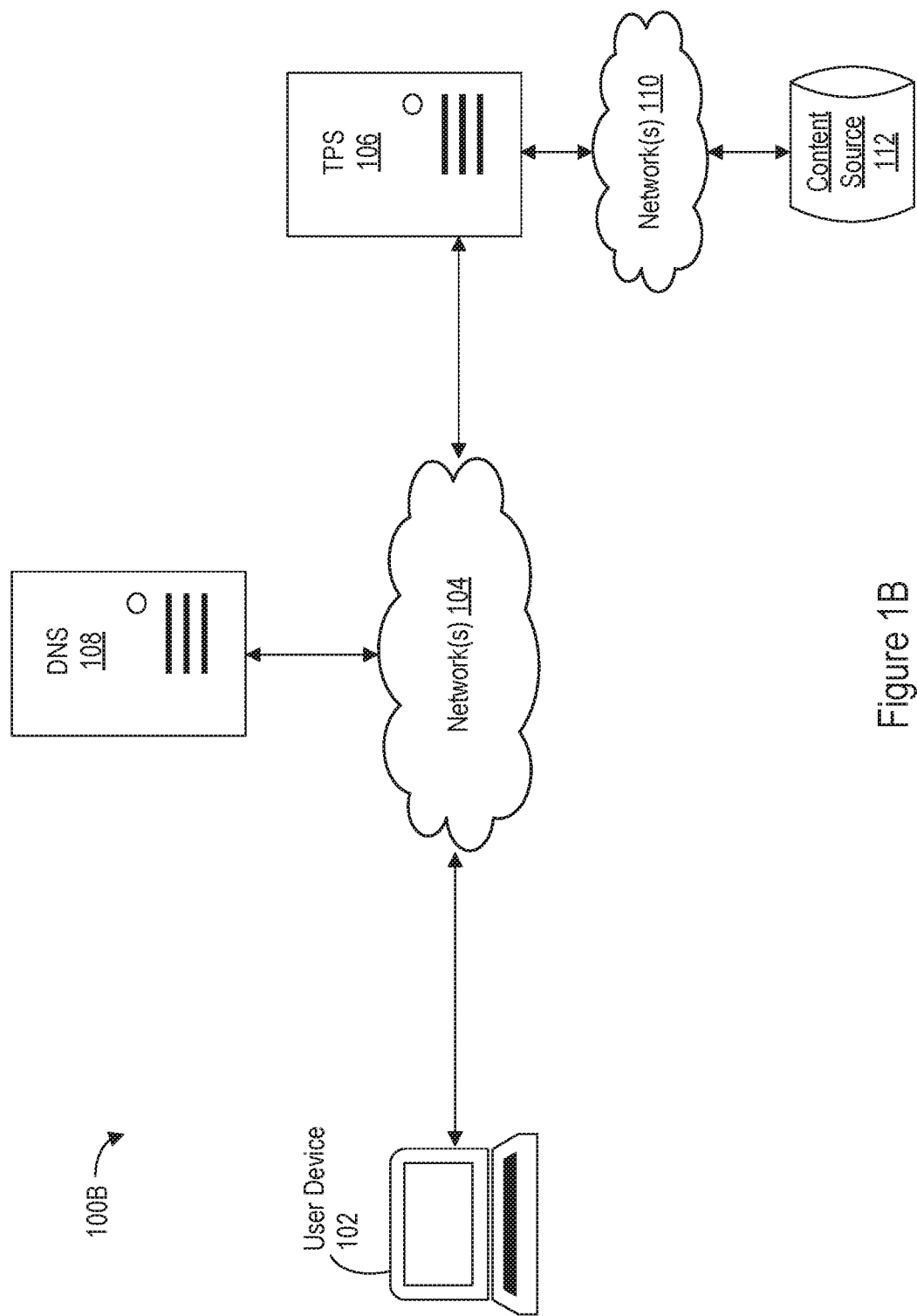

The content producer 106 may be the original source of particular content items in the network. Alternatively, as illustrated for the network architecture 100B (FIG. 1B), the content producer 106 may cache content received from a content source 112 via one or more networks 110. (The term caching as used herein refers to storing content locally at a device and does not imply that the content is stored in any particular type of memory.) For example, the content producer 106 may be a transparent proxy server (TPS). The TPS may receive a data object from the content source 112 in response to an initial request from a user device 102 for the data object, determine if the data object is cacheable, and cache the data object if it is cacheable. The TPS may then service subsequent requests for the data object from its cache, without forwarding the subsequent requests to the content source 112.

Other networked devices may also cache content and service requests. For example, as illustrated for the network architecture 100C (FIG. 1C), a router 114 may be used to communicatively couple the user device 102, content producer 106, and/or DNS network node 108, in conjunction with other network devices that compose one or more networks 104-1 and 104-2. In some implementations, the router 114 includes a cache and is used to service requests for cached content. For example, like the TPS, the router 114 may receive a data object from the content producer 106 in response to an initial request from a user device 102 for the data object, determine if the data object is cacheable, and cache the data object if it is cacheable. The router 114 may then service subsequent requests for the data object from its cache, without forwarding the subsequent requests to the content producer 106.

In some implementations, the network architecture 100 implements ICN or hICN. User devices 102 request content by name through requests known as interests. Intermediate entities such as the content producer 106 (e.g., TPS) and/or router 114 may cache content, as discussed, and service interests if the requested content is cached. Accordingly, the content producer 106 and/or router 114 may be configured for ICN and/or hICN.

Figure 2A:
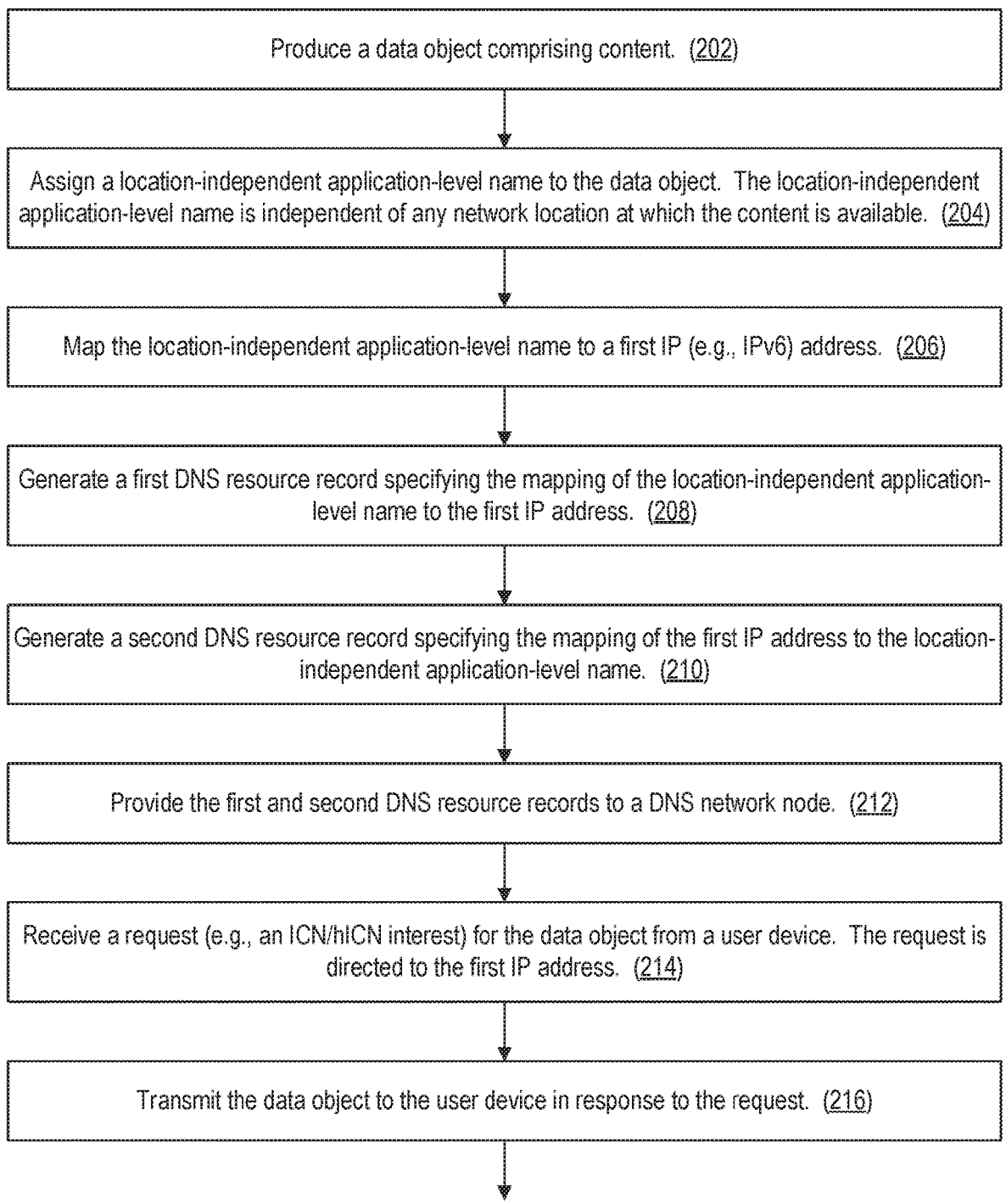
FIGS. 2A-2C show flowcharts illustrating networking methods in accordance with some implementations.
Figure 2B:
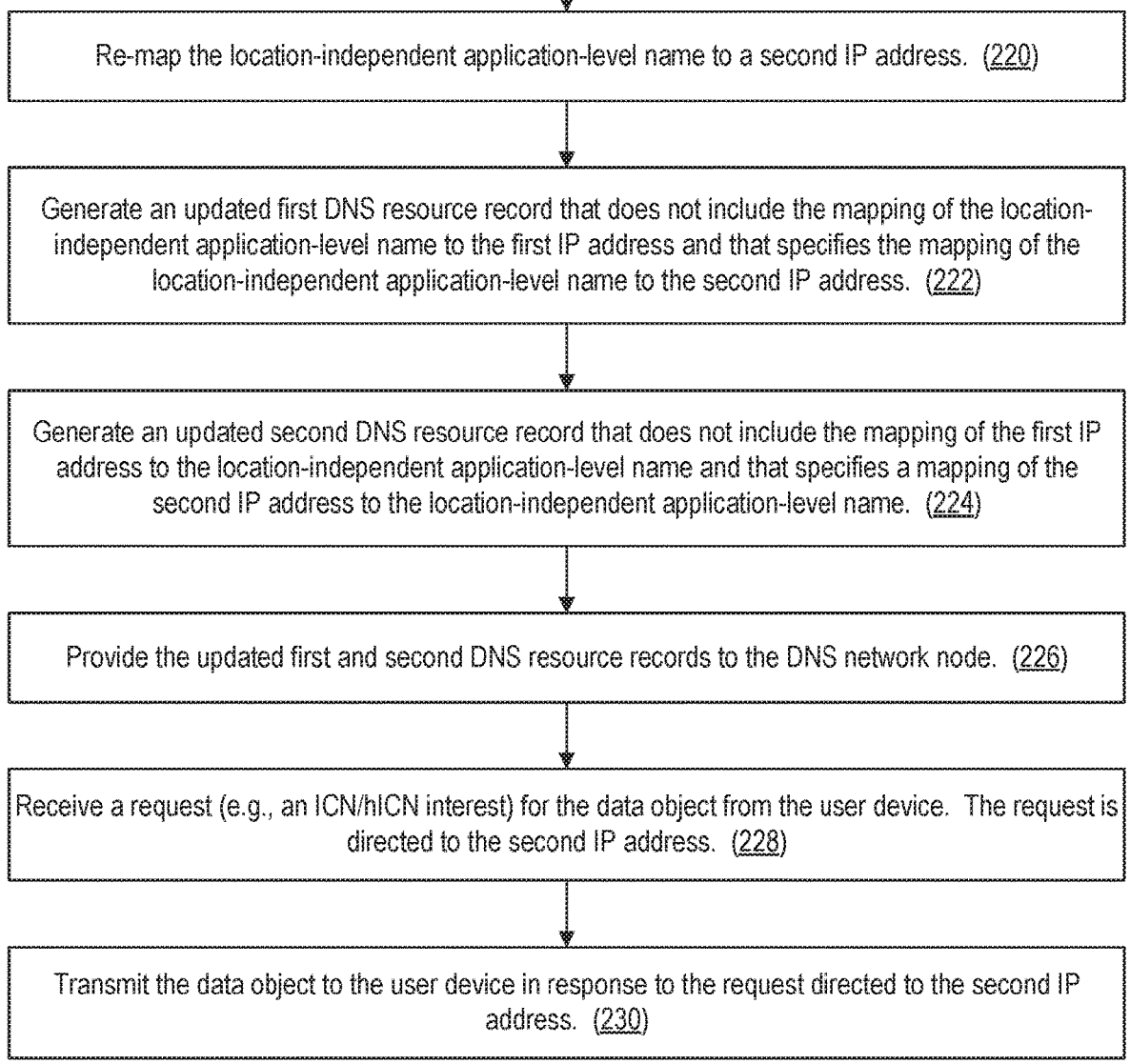

FIGS. 2A and 2B show a flowchart illustrating a networking method 200 in accordance with some implementations. The method 200 is performed by a networked electronic device (e.g., content producer 106, such as a TPS, FIGS. 1A-1B; router 114, FIG. 1C), which may be configured for ICN/hICN. The method 200 is described with reference to FIGS. 3A-3B, which illustrate examples of DNS resource records used in the method 200.

In the method 200, a data object (e.g., an ICN/hICN data object) that comprises content is produced (202, FIG. 2A). A location-independent application-level name is assigned (204) to the data object. The application-level name is location-independent in that it does not indicate a network location at which the content is available. For example, the location-independent application-level name does not include a domain name that is specific to any network interface. Examples of the location-independent application-level name include, without limitation, a Uniform Resource Identifier (URI) or an entity tag (ETag).

In some implementations, the location-independent application-level name includes an authority field (e.g., a field separated by slashes in a URI) that serves as a locator for a trust anchor through which at least one of a security certificate and a public key for the networked electronic device can be obtained. A user device 102 may use the information in the authority field to obtain the security certificate and/or public key and verify the data object. For example, the networked electronic device may sign the data object with a signature generated using a private key based on the content of the data object, as part of producing (202) the data object. The user device 102 may verify the signature using the public key obtained from the trust anchor.

In some implementations, the authority field may be common to a plurality of location-independent application-level names used by the networked electronic device to index a plurality of data objects. The data object thus may be one of a plurality of data objects produced by the networked electronic device and the location-independent application-level name may be one of a plurality of location-independent application-level names used by the networked electronic device to index the plurality of data objects. Each location-independent application-level name of the plurality of location-independent application-level names may be independent of any network location at which content for the respective data object is stored. Using a common authority field (i.e., using the same value in all of the authority fields) for the plurality of location-independent application-level names allows a user device 102 to verify multiple data objects received from the networked electronic device after accessing the trust anchor only once, thereby speeding verification and reducing network traffic.

The location-independent application-level name is mapped (206) to a first IP address. In some implementations, the first IP address is a 128-bit IP version 6 (IPv6) address (e.g., in network byte order).

In some implementations, the networked electronic device is a server system executing a web-server video application. The data object comprises video content and is one of a plurality of video objects produced by the web-server video application. The location-independent application-level name is one of a plurality of location-independent application-level names used by the web-server video application to index the plurality of video objects. Each location-independent application-level name of the plurality of location-independent application-level names is independent of any network location at which content for the respective data object is stored. Similarly, the networked electronic device may be a server system executing a web-server audio application and the data object may be one of a plurality of audio objects produced by the web-server audio application and indexed by the location-independent application-level names.

A first DNS resource record is generated (208) that specifies the mapping of the location-independent application-level name to the first IP address. A second DNS resource record is generated (210) that specifies the mapping of the first IP address to the location-independent application-level name. The mapping provided by the second DNS resource record is the reverse of the mapping provided by the first DNS resource record.

FIG. 3A shows a data structure for the first DNS resource record 300 in accordance with some implementations. The resource record 300 may be referred to as an application-name resource record. The resource record 300 includes a name field 302 that stores a URI (or other type of name) as the location-independent application-level name, a type field 304 that specifies a resource-record type (e.g., "URI"), a class field 306 that specifies a resource-record class (e.g., "Internet" or class-independent), and a time-to-live (TTL) field 308 that specifies a time period (e.g., in seconds) for which the resource record 300 remains valid. The resource record 300 thus expires after a time period equal to the TTL has elapsed (e.g., after the resource record 300 is provided to the DNS network node 108). The resource record 300 further includes an RDLength field 310 that specifies a length of a subsequent RData field 312, and the RData field 312, which specifies the IP (e.g., IPv6) address. The values in the fields of the resource record 300 are specified as part of generating (208) the resource record 300, in accordance with some implementations.

FIG. 3B shows a data structure for the second DNS resource record 320 in accordance with some implementations. The resource record 320 may be referred to as a network-name resource record. The resource record 320 includes an address field 322 that stores the IP (e.g., IPv6) address, a type field 324 that specifies a resource-record type (e.g., "AAAA"), a class field 326 that specifies a resource-record class (e.g., "Internet" or class-independent), and a time-to-live (TTL) field 328 that specifies a time period (e.g., in seconds) for which the resource record 320 remains valid. The resource record 320 thus expires after a time period equal to the TTL has elapsed (e.g., after the resource record 320 is provided to the DNS network node 108). The resource record 320 further includes an RDLength field 330 that specifies a length of a subsequent RData field 332, and the RData field 332, which specifies a URI (or other type of name) as the location-independent application-level name. The values in the fields of the resource record 320 are specified as part of generating (210) the resource record 320, in accordance with some implementations.

The first and second DNS resource records are provided (212) to a DNS network node 108. The DNS network node 108 uses the first resource record to provide the first IP address in response to queries specifying the location-independent application-level name. The DNS network node 108 uses the second resource record to provide the location-independent application-level name in response to queries specifying the first IP address.

In some implementations, the mapping of the second DNS resource record is applied to the first IP address specified in the first DNS resource record, to verify the first DNS resource record. Because the mapping of the second DNS resource record is the reverse of the mapping of the first DNS resource record, applying the mapping of the second DNS resource record to the IP address specified in the first DNS resource record should produce the location-independent application-level name.

A request (e.g., an ICN/hICN interest) for the data object is received (214) from a user device 102. The request is directed to the first IP address, as obtained for example from a DNS lookup based on the location-independent application-level name (e.g., a query directed to the DNS network node 108). In response to the request, the data object is transmitted (216) to the user device 102.

In some implementations, after the first and second DNS resource records are provided (212) to the DNS network node 108, the location-independent application-level name is re-mapped (220, FIG. 2B) to a second IP (e.g., IPv6) address. An updated first DNS resource record (e.g., resource record 300, FIG. 3A) is generated (222) that does not include the mapping of the location-independent application-level name to the first IP address and that specifies the mapping of the location-independent application-level name to the second IP address. An updated second DNS resource record (e.g., resource record 320, FIG. 3B) is generated (224) that does not include the mapping of the first IP address to the location-independent application-level name and that specifies a mapping of the second IP address to the location-independent application-level name. The re-mapping of the second DNS resource record is thus the reverse of the re-mapping of the first DNS resource record, with the first IP address being replaced by the second IP address.

The re-mapping (220) and generation (222-224) of the updated DNS resource records may be performed, for example, in response to a change in association of the networked electronic device from the first IP address to the second IP address.

The updated first and second DNS resource records are provided (226) to the DNS network node 108, where they replace the previous versions of the first and second DNS resource records.

In some implementations, after the updated first and second DNS resource records are provided (226) to the DNS network node 108, a request (e.g., an ICN/hICN interest) is received (228) for the data object from a user device 102. The request is directed to the second IP address (e.g., as a result of querying the DNS network node 108, which provides the second IP address in response to a query specifying the location-independent application-level name). In response to the request, the data object is transmitted (230) to the user device 102. The user device 102 of steps 228 and 230 may be the same as or different from the user device 102 of steps 214 and 216 (FIG. 2A).

Figure 2C:
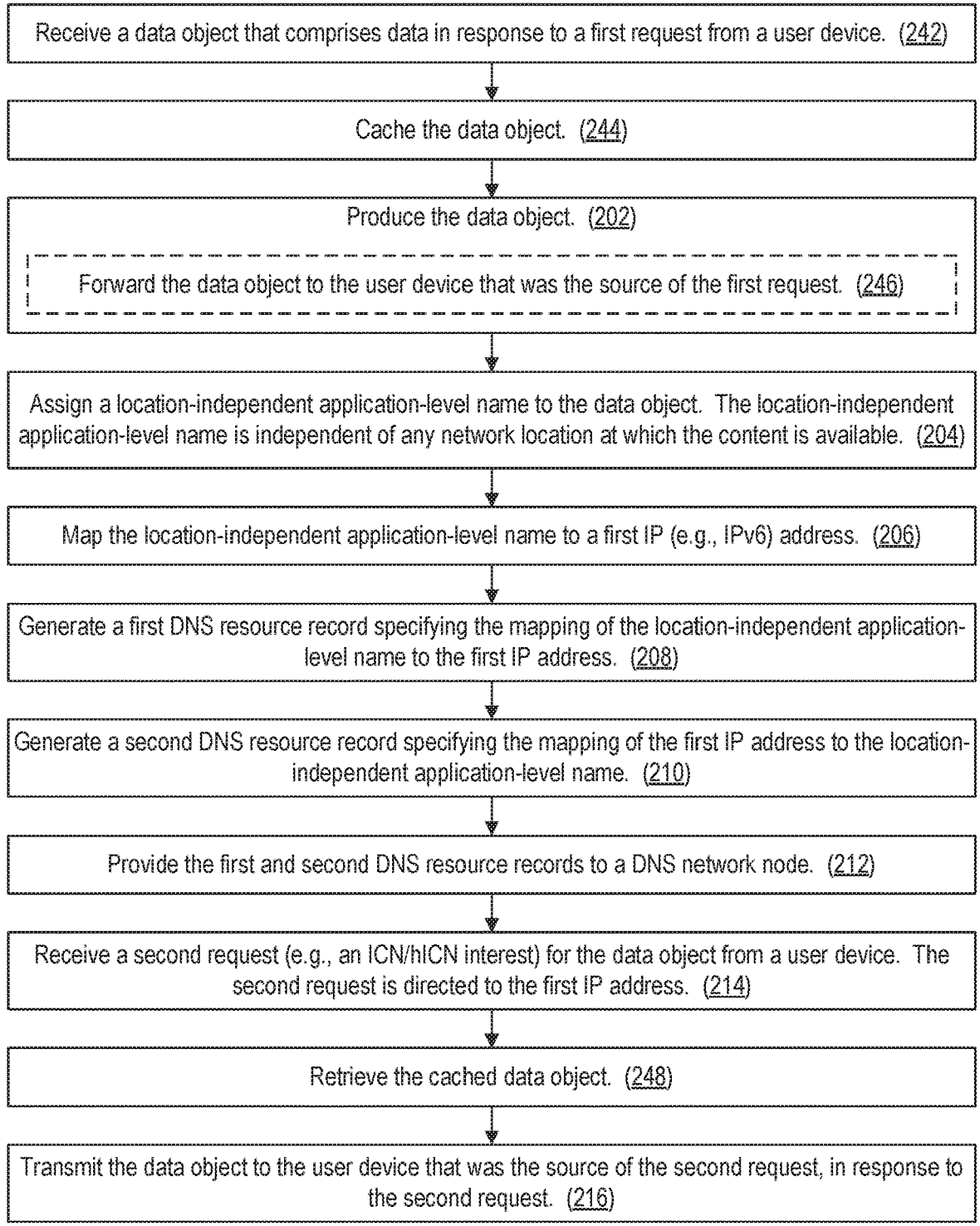

FIG. 2C shows a flowchart illustrating a networking method 240 that is a variant of the method 200, in accordance with some implementations. The method 240, like the method 200, is performed by a networked electronic device (e.g., content producer 106, such as a TPS, FIGS. 1A-1B; router 114, FIG. 1C).

In the method 240, the data object of the method 200 is received (242) in response to a first request from a user device 102 and is cached (244). In some implementations, a determination is made as to whether the data object is cacheable and the caching occurs (244) in response to a positive determination. The data object is produced (202): the networked electronic device forwards (246) the data object to the user device 102 that was the source of the first request.

In some implementations, the data object is one of a plurality of data objects cached at the networked electronic device (e.g., by an application running on the networked electronic device, such as a TPS application) and the location-independent application-level name is one of a plurality of location-independent application-level names used to index the plurality of data objects. Each location-independent application-level name of the plurality of location-independent application-level names is independent of any network location at which content for the respective data object is stored.

All or a portion of the steps 204-214 are performed. In response to the request of step 214 for the data object, which in the method 200 is a second request, the cached data object is retrieved (248) and transmitted (216) to the user device 102 that was the source of the second request. The user device 102 of steps 214 and 216 may be the same as or different from the user device 102 of steps 242 and 246.

Steps in the methods 200 (FIGS. 2A-2B) and 240 (FIG. 2C) may be combined, broken out, and/or omitted. The sequence of the methods 200 and 240 may be modified for steps that are not order-dependent.

The methods 200 and 240 thus enable real-time binding of a name-space to data objects as the data objects are produced. Furthermore, the method 240 allows a name-space to be used for distributed caching in a network before the entities that perform the caching even receive respective requests (e.g., ICN or hICN interests).

Figure 4:
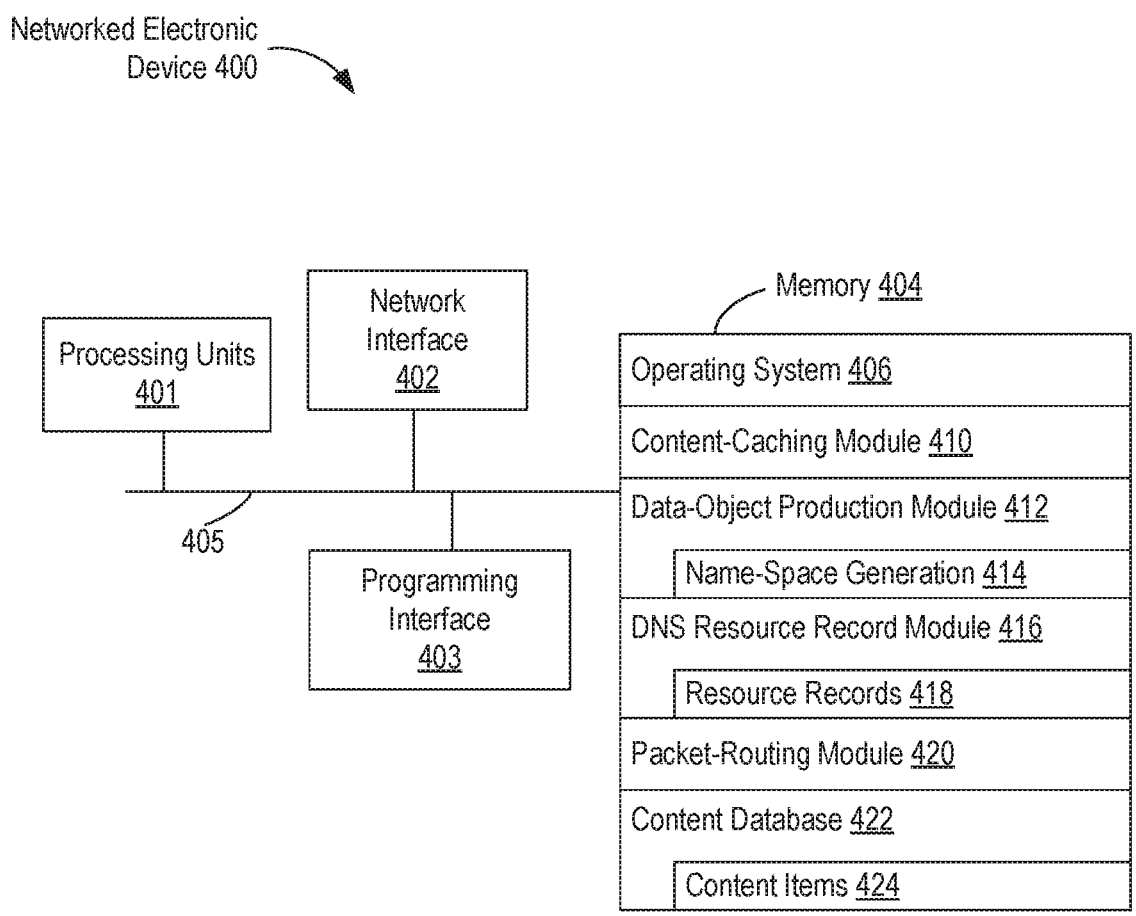
FIG. 4 is a block diagram of a networked electronic device in accordance with some implementations.

FIG. 4 is a block diagram of an electronic device 400 (e.g., content producer 106, such as a TPS, FIGS. 1A-1B; router 114, FIG. 1C) according to some implementations. The electronic device 400 is an example of the networked electronic device that performs the methods 200 and/or 240 (FIGS. 2A-2C). While certain features are illustrated, those of ordinary skill in the art will appreciate from the present disclosure that various other features have not been illustrated for the sake of brevity, and so as not to obscure more pertinent aspects of the implementations disclosed herein. To that end, in some implementations the network device 400 includes one or more processing units (e.g., CPUs, network processors, etc.) 401, a network interface 402, a programming interface 403, memory 404, and one or more communication buses 405 for interconnecting these and various other components.

In some implementations, the memory 404 or a non-transitory computer-readable storage medium of the memory 404 stores the following programs, modules, and data structures, or a subset thereof: an optional operating system 406, a content-caching module 410, a data-object production module 412, a DNS resource record module 416, a packet-routing module 420, and a content database 422. The operating system 406 includes procedures for handling various basic system services and for performing hardware-dependent tasks. The content-caching module 410 includes instructions for caching content items 424 (e.g., in the form of data objects, wherein multiple data objects may correspond to a single content item) in the database 422. The data-object production module 412 includes name-space generation instructions 414. The DNS resource record module 416 includes instructions for generating and pushing out resource records 418 (e.g., resource records 300 and/or 320, FIGS. 3A-3B). The packet-routing module 420 includes instructions for transmitting packets that include requests and/or data objects. The memory 404 or a non-transitory computer-readable storage medium of the memory 404 thus may include instructions for performing the methods 200 and/or 240 (FIGS. 2A-2C).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first request could be termed a second request, and, similarly, a second request could be termed a first request, without changing the meaning of the description, so long as all occurrences of the first request are renamed consistently and all occurrences of the second request are renamed consistently. The first request and the second request are both requests, but they are not the same request.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising:
   assigning, by a networked electronic device, a location-independent application-level name to a data object comprising content, the location-independent application-level name being independent of a network location at which the content is available;
   mapping the location-independent application-level name assigned to the content to a first Internet Protocol (IP) address;
   generating a first Domain-Name-System (DNS) resource record specifying the mapping of the location-independent application-level name to the first IP address;
   generating a second DNS resource record specifying a mapping of the first IP address to the location-independent application-level name assigned to the content, wherein the mapping of the first IP address to the location-independent application-level name specified by the second DNS resource record is reverse of the mapping of the location-independent application-level name to the first IP address specified by the first DNS resource record, wherein the second DNS resource record comprises an address field that stores the first IP address, a type field that specifies a resource record type, and a class field that specifies the resource-record type, wherein the location-independent application-level name comprises an authority field having a locator for a trust anchor through which at least one of a security certificate and a public key for the networked electronic device can be obtained, and wherein the authority field is common to a plurality of location-independent application-level names used by the networked electronic device to index a plurality of data objects;
   applying the mapping of the second DNS resource record to the first IP address specified in the first DNS resource record to verify the first DNS resource record; and
   providing the first DNS resource record and the second DNS resource record to a DNS network node.

2. The method of claim 1, wherein:
   the location-independent application-level name comprises a Uniform Resource Identifier (URI); and
   the first IP address is an Internet Protocol version 6 (IPv6) address.

3. The method of claim 1, wherein:
   the location-independent application-level name comprises an entity tag (ETag); and
   the first IP address is an Internet Protocol version 6 (IPv6) address.

4. The method of claim 1, further comprising, at the networked electronic device, after providing the first DNS resource record:

re-mapping the location-independent application-level name to a second IP address;
generating an updated first DNS resource record that does not include the mapping of the location-independent application-level name to the first IP address and that specifies the mapping of the location-independent application-level name to the second IP address; and
providing the updated first DNS resource record to the DNS network node.

5. The method of claim 4, wherein the re-mapping and generating the updated first DNS resource record are performed in response to a change in association of the networked electronic device from the first IP address to the second IP address.

6. The method of claim 4, further comprising, at the networked electronic device, after re-mapping the location-independent application-level name to the second IP address:
generating an updated second DNS resource record that does not include the mapping of the first IP address to the location-independent application-level name and that specifies a mapping of the second IP address to the location-independent application-level name, and
providing the updated second DNS resource record to the DNS network node.

7. The method of claim 1, further comprising, at the networked electronic device, after providing the first DNS resource record to the DNS network node:
receiving a request for the data object from a user device, the request being directed to the first IP address; and
transmitting the data object to the user device in response to the request.

8. The method of claim 7, wherein:
the networked electronic device is configured for Information-Centric Networking (ICN) or hybrid ICN (hICN);
the request is an ICN or hICN interest; and
the data object is an ICN or hICN data object.

9. The method of claim 8, wherein the ICN or hICN interest is directed to the first IP address, as obtained from a DNS lookup based on the location-independent application-level name.

10. The method of claim 1, wherein:
the networked electronic device is a server system executing a web-server video application;
the data object comprises video content and is one of a plurality of video objects produced by the web-server video application; and
the location-independent application-level name is one of the plurality of location-independent application-level names used by the web-server video application to index the plurality of video objects, wherein each location-independent application-level name of the plurality of location-independent application-level names is independent of any network location at which content for the respective data object is stored.

11. The method of claim 1, further comprising, at the networked electronic device:
receiving the data object in response to a first request from a user device;
caching the data object at the networked electronic device; and
forwarding the data object to the user device that was the source of the first request.

12. The method of claim 11, further comprising, at the networked electronic device, after caching the data object and performing the mapping, generating, and producing:
receiving a second request for the data object from a user device, the second request being directed to the first IP address;
retrieving the cached data object; and
transmitting the retrieved data object to the user device that was the source of the second request.

13. The method of claim 12, wherein:
the networked electronic device is a server system executing a transparent proxy server (TPS) application;
the data object is one of a plurality of data objects cached at the networked electronic device by the TPS application; and
the location-independent application-level name is one of the plurality of location-independent application-level names used by the TPS application to index the plurality of data objects, wherein each location-independent application-level name of the plurality of location-independent application-level names is independent of any network location at which content for the respective data object is stored.

14. The method of claim 12, wherein:
the networked electronic device is a router;
the data object is one of a plurality of data objects cached at the router; and
the location-independent application-level name is one of the plurality of location-independent application-level names used by the router to index the plurality of data objects, wherein each location-independent application-level name of the plurality of location-independent application-level names is independent of any network location at which content for the respective data object is stored.

15. The method of claim 1, wherein:
generating the first DNS resource record comprises specifying a time to live (TTL) for the first DNS resource record; and
the first DNS resource record expires after a time period equal to the TTL has elapsed after providing the first DNS record to the DNS network node.

16. The method of claim 1, wherein:
the location-independent application-level name comprises an authority field that serves as a locator for a trust anchor through which at least one of a security certificate and a public key for the networked electronic device can be obtained;
the data object is one of a plurality of data objects produced by the networked electronic device; and
the location-independent application-level name is one of the plurality of location-independent application-level names used by the networked electronic device to index the plurality of data objects, wherein each location-independent application-level name of the plurality of location-independent application-level names is independent of any network location at which content for the respective data object is stored.

17. A non-transitory computer-readable storage medium storing a set of instructions, which when executed by a networked device, perform a method comprising:
assigning a location-independent application-level name to a data object comprising content, the location-independent application-level name being independent of any network location at which the content is available;
mapping the location-independent application-level name to a first Internet Protocol (IP) address;
generating a first Domain-Name-System (DNS) resource record specifying the mapping of the location-independent application-level name to the first IP address;

generating a second DNS resource record specifying a mapping of the first IP address to the location-independent application-level name, wherein the mapping of the first IP address to the location-independent application-level name specified by the second DNS resource record is reverse of the mapping of the location-independent application-level name to the first IP address specified by the first DNS resource record, wherein the second DNS resource record comprises an address field that stores the first IP address, a type field that specifies a resource record type, and a class field that specifies the resource-record type, wherein the location-independent application-level name comprises an authority field having a locator for a trust anchor through which at least one of a security certificate and a public key for the networked electronic device can be obtained, and wherein the authority field is common to a plurality of location-independent application-level names used by the networked electronic device to index a plurality of data objects;

applying the mapping of the second DNS resource record to the first IP address specified in the first DNS resource record, to verify the first DNS resource record; and providing the first DNS resource record and the second DNS resource record to a DNS network node.

18. An electronic device for deployment in a network, comprising:

a memory storage;

a processor coupled to the memory storage, wherein the processor is operative to:

assign a location-independent application-level name to a data object comprising content, the location-independent application-level name being independent of any network location at which the content is available;

map the location-independent application-level name assigned to the content to a first Internet Protocol (IP) address;

generate a first Domain-Name-System (DNS) resource record specifying the mapping of the location-independent application-level name to the first IP address;

generate a second DNS resource record specifying a mapping of the first IP address to the location-independent application-level name assigned to the content, wherein the mapping of the first IP address to the location-independent application-level name specified by the second DNS resource record is reverse of the mapping of the location-independent application-level name to the first IP address specified by the first DNS resource record, wherein the second DNS resource record comprises an address field that stores the first IP address, a type field that specifies a resource record type, and a class field that specifies the resource-record type, wherein the location-independent application-level name comprises an authority field having a locator for a trust anchor through which at least one of a security certificate and a public key for the networked electronic device can be obtained, and wherein the authority field is common to a plurality of location-independent application-level names used by the networked electronic device to index a plurality of data objects;

apply the mapping of the second DNS resource record to the first IP address specified in the first DNS resource record, to verify the first DNS resource record; and provide the first DNS resource record and the second DNS resource record to a DNS network node.

19. The electronic device of claim 18, wherein the location-independent application-level name does not include a domain name that is specific to a network interface.

20. The electronic device of claim 18, wherein the location-independent application-level name comprises a Uniform Resource Identifier (URI), and wherein the first IP address is an Internet Protocol version 6 (IPv6) address.

\* \* \* \* \*